United States Patent [19]
Ooi

[11] Patent Number: 5,491,371
[45] Date of Patent: Feb. 13, 1996

[54] ELECTRICAL MACHINERY LAMINATIONS COOLING

[75] Inventor: Kean K. Ooi, Yorba Linda, Calif.

[73] Assignee: Able Corporation, Yorba Linda, Calif.

[21] Appl. No.: 165,321

[22] Filed: Dec. 13, 1993

[51] Int. Cl.⁶ .............. H02K 9/18; H02K 9/19; H02K 9/22; H02K 1/12

[52] U.S. Cl. .............. 310/58; 310/64; 310/216

[58] Field of Search .............. 310/58, 59, 64, 310/65, 216, 254

[56] References Cited

U.S. PATENT DOCUMENTS

| | | | |
|---|---|---|---|
| 1,529,993 | 3/1925 | Ehrmann | 310/64 |
| 1,882,487 | 10/1932 | Dupont | 310/64 |
| 2,735,950 | 2/1956 | Brown | 310/64 |
| 3,009,072 | 11/1961 | Mossay | 310/64 |
| 3,471,727 | 10/1969 | Sedlock et al. | 310/59 |
| 3,531,668 | 9/1970 | Cathey | 310/58 |
| 4,102,040 | 7/1978 | Rich | 310/216 |
| 4,912,350 | 3/1990 | Parshall et al. | 310/59 |
| 4,918,343 | 4/1990 | Heinrich et al. | 310/58 |
| 5,062,330 | 11/1991 | Trautmann et al. | 310/58 |
| 5,173,629 | 12/1992 | Peters | 310/216 |
| 5,331,238 | 7/1994 | Johnsen | 310/58 |

FOREIGN PATENT DOCUMENTS

| | | | |
|---|---|---|---|
| 521948 | 10/1953 | Belgium | 310/64 |
| 59-21250 | 2/1984 | Japan | 310/64 |
| 437176 | 2/1975 | U.S.S.R. | 310/64 |
| 694940 | 10/1979 | U.S.S.R. | 310/64 |
| 1014093 | 4/1983 | U.S.S.R. | 310/254 |

Primary Examiner—Clayton E. LaBalle
Attorney, Agent, or Firm—William W. Haefliger

[57] ABSTRACT

A lamination for the stator or rotor of an electrical machine, the improvement comprising the lamination having a first periphery extending about a central axis defined by the lamination; the lamination also having a series of circularly spaced protrusions projecting away from the periphery and from the main extent of the lamination; whereby a stack of laminations, at least some of which incorporate the protrusions, define fluid coolant passages adjacent the protrusions.

16 Claims, 4 Drawing Sheets

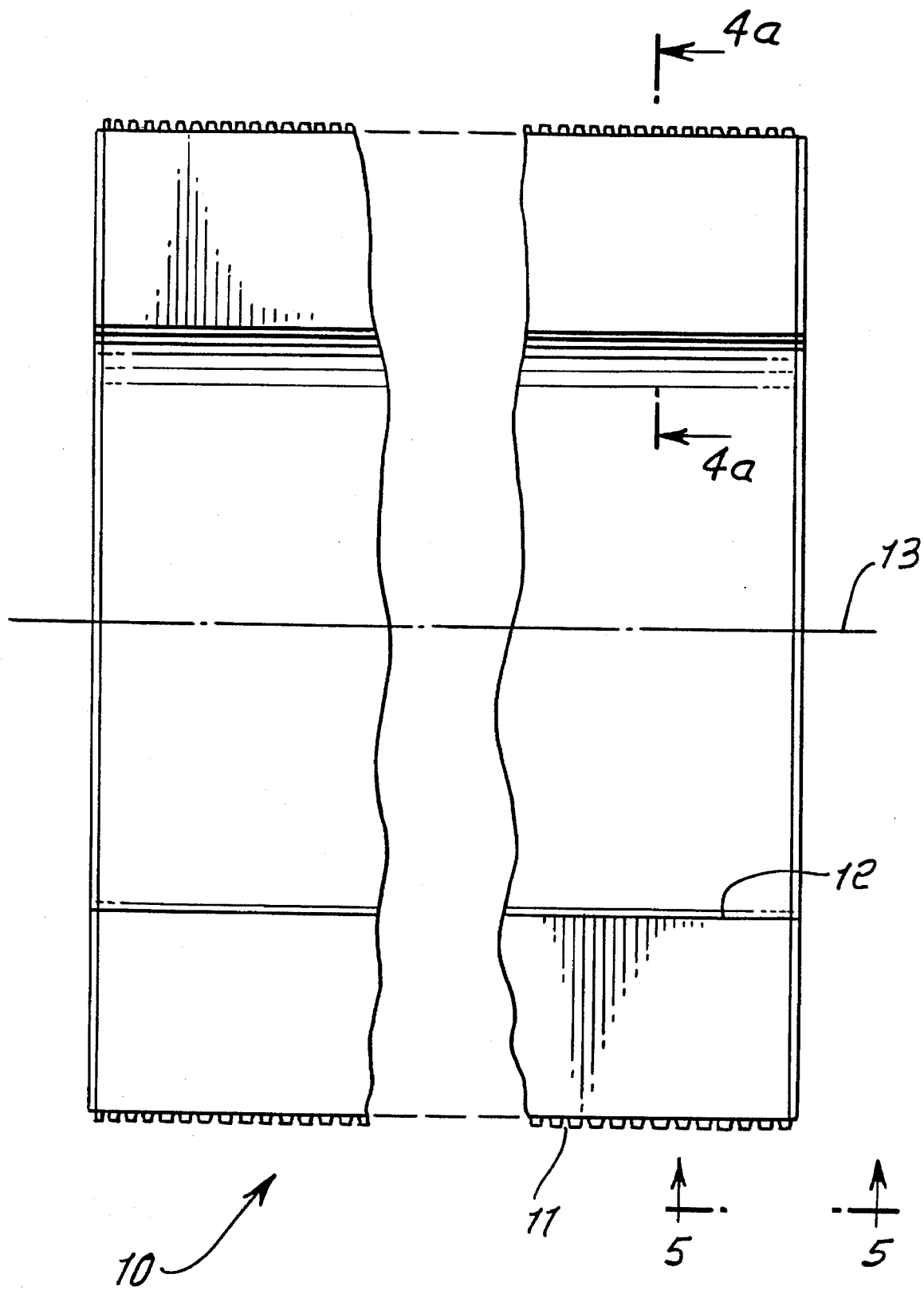

ELECTRICAL MACHINERY LAMINATIONS COOLING

BACKGROUND OF THE INVENTION

This invention relates generally to the cooling of electrical machinery, and more particularly to means to effect more efficient heat transfer from laminations in stator or rotor elements of such machinery.

When the sizes of stators or rotors of such machinery, as in electrical motors, is reduced while power handling remains the same, or is not proportionately reduced, adequate cooling becomes a problem. This is because the surface area available for heat transfer to coolant fluid is reduced. The problem becomes acute wherein highly efficient motors of small size are to be adequately cooled. There is need for efficient, improved heat transfer apparatus usable in conjunction with such stators and rotors, to handle their critical cooling requirements.

SUMMARY OF THE INVENTION

It is a major object of the invention to provide improved cooling apparatus meeting the above need. Basically, the apparatus of the invention is associated with a stator or rotor lamination, or laminations, and comprises:

a) the lamination having a first periphery extending about a central axis defined by the lamination, b) the lamination also having a series of circularly spaced protrusions or ribs projecting away from the periphery and from the main extent of the lamination, c) whereby a stack of laminations, at least some of which incorporate the protrusions, define fluid coolant passages adjacent the protrusions.

As will appear, the protrusions or ribs project generally radially relative to the axis; and they are typically circularly spaced about the lamination axis. Also, they typically have like shape, to register and form a group of such protrusions upon lamination stacking.

It is another object of the invention to incorporate the invention into a lamination having a second periphery extending about the axis, the lamination having slots intersecting the second periphery and extending into the lamination from the second periphery, the slots spaced about the axis. The slots extend toward the protrusions but are everywhere spaced therefrom.

Yet another object is to provide a coaxial stack of laminations, there being spaced groups of the protrusions wherein the protrusions in each group extend in side-by-side stacked relation to transfer heat therebetween. As will be seen, the protrusions in each group project generally radially relative to the axis; and the protrusions in the groups have outermost edges which define a cylinder coaxial with the axis.

A further object is to provide groups of protrusions which are circularly spaced in multiple rows, the rows axially spaced apart; and wherein the groups of protrusions in a row "n" are angularly offset about the axis from the groups of protrusions in row (n+1) and in a row (n−1), whereby serpentine fluid flow passages are defined by spaces between the groups of protrusions.

A further object is to provide additional laminations in the stack and located between the laminations that define the rows of protrusions. As will appear, the groups of laminations, in an axial direction, are staggered.

The protrusions may be employed on laminations for stators or rotors of AC, or DC electrical machinery, such as motors or generators.

These and other objects and advantages of the invention, as well as the details of an illustrative embodiment, will be more fully understood from the following specification and drawings, in which:

DRAWING DESCRIPTIONS

FIG. 4 is a side elevation showing a stator lamination stack;

DETAILED DESCRIPTION

Figure 1:
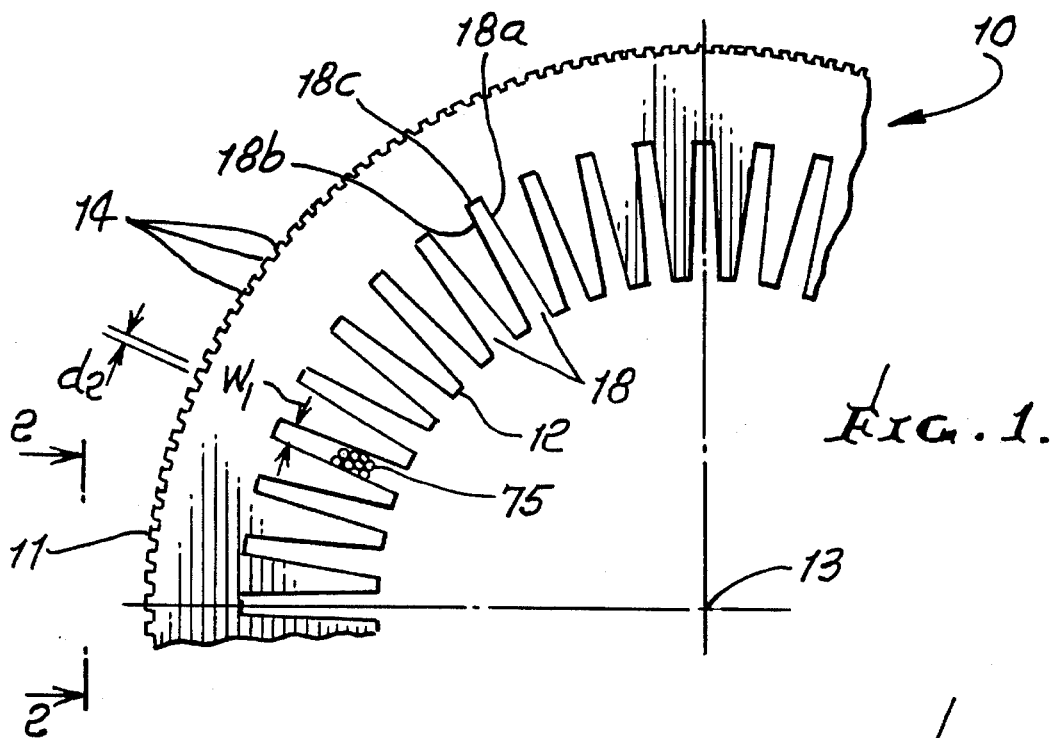
FIG. 1 is an elevation showing a portion of a lamination incorporating the invention.
Figure 2:
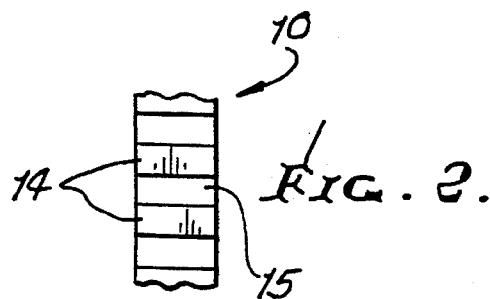
FIG. 2 is an enlarged fragmentary view taken on lines 2—2 of FIG. 1.
Figure 1A:
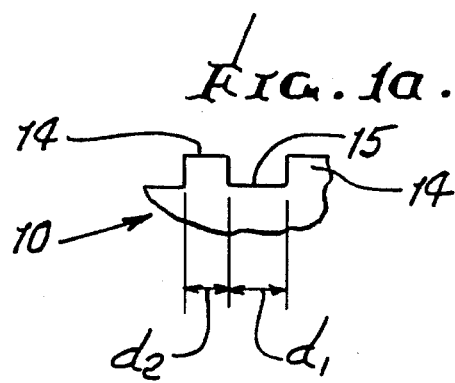
FIG. 1a is an enlarged side view of a protrusion.

Referring first to FIGS. 1 and 1a, a thin, metallic, stator lamination 10 for an electrical machine, such as a motor, has an outer, circular periphery 11 and an inner, circular periphery 12, a central longitudinal axis appearing at 13. Thus, the lamination is annular.

The lamination has a series of circularly spaced ribs or protrusions 14 projecting outwardly and away from the first or outer periphery 11, i.e., away from the main annular extent of the lamination. The protrusions typically project generally radially relative to the axis 13; they may have like shape, which is generally rectangular, as seen in FIG. 1 and in FIG. 1a; and, as shown, they are equally spaced about axis 13. See the gaps 15 between the protrusions, and which have like gap shape, i.e., radial and circular dimensions. The gaps may be of slightly greater circular dimension $d_1$ than the circular dimensions $d_2$ of the protrusions.

The lamination 10 also has slots 18 intersecting the second or inner periphery 12, and extending into the main extent of the lamination body, from periphery 12. The slots are typically alike and are equally spaced about the axis 13, as shown. The slot elongated walls 18a and 18b extend substantially radially toward axis 13, and are elongated relative to the slot width. All the slots may terminate at a circle about axis 13, defined by the bottoms 18c of the slots, in spaced relation to the protrusions. Typically, the slot minimum widths "$w_1$" are substantially greater than the annular dimensions "$d_2$" of the like protrusions. Also, the spacing between successive of the protrusions, about the axis, is substantially less than the spacing of successive of the slots, about the axis. Aligned slots receive electrical wiring, indicated at 75, as in a motor or generator.

Figure 4A:
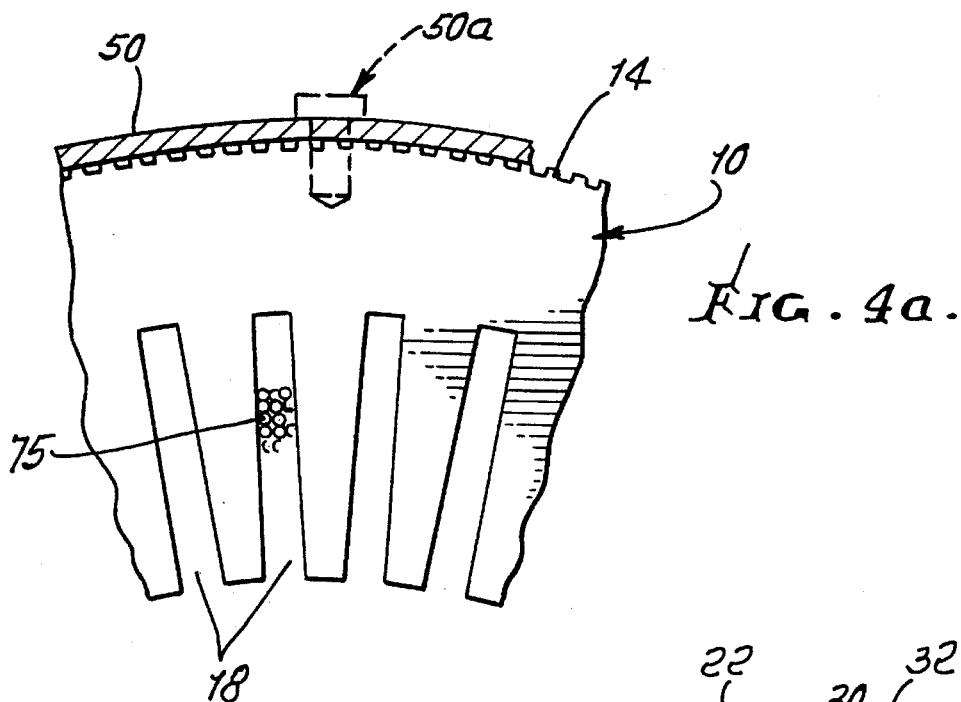
FIG. 4a is an enlarged fragmentary end view taken on lines 4a—4a of FIG. 4.
Figure 5:
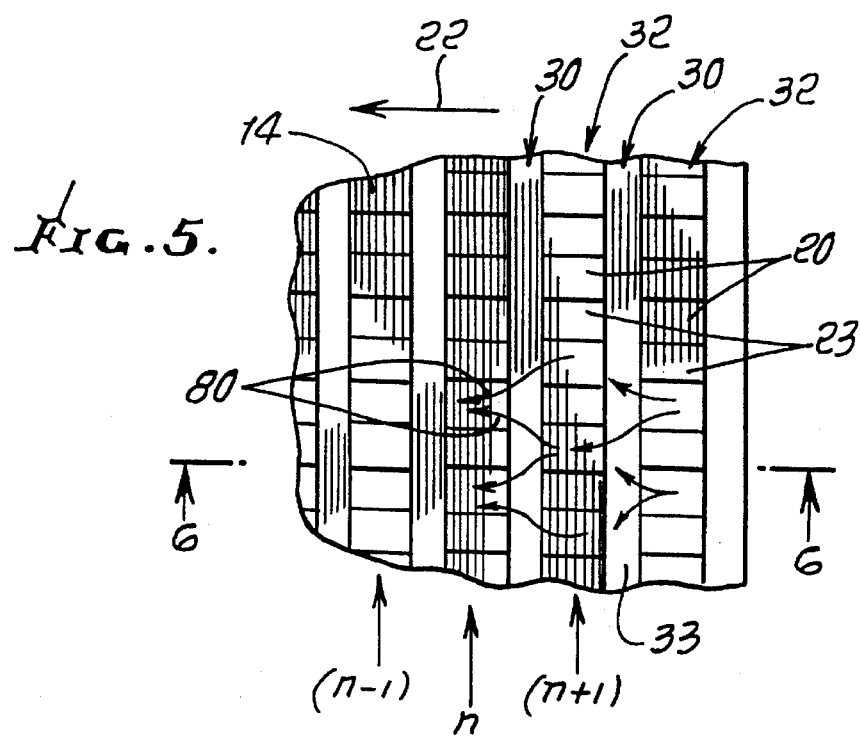
FIG. 5 is an enlarged fragmentary elevation taken on lines 5—5 of FIG. 4.
Figure 6:
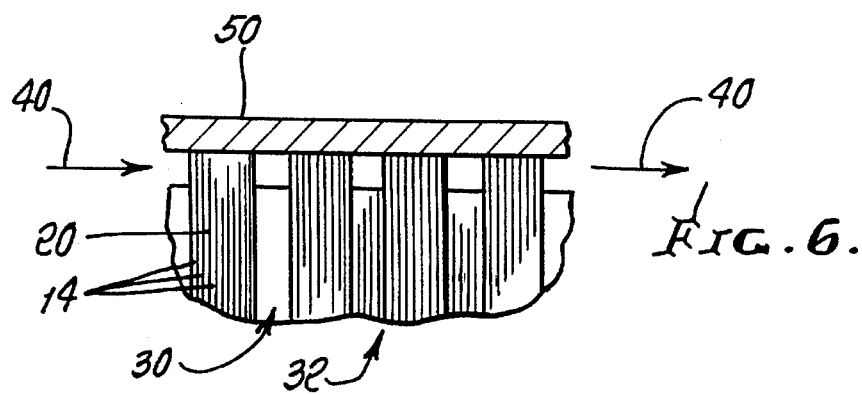
FIG. 6 is a section taken on lines 6—6 of FIG. 5.

Referring to FIGS. 4–6, the invention also extends to a coaxial assembly of such laminations wherein the protrusions thereon are located in groups 20 (see FIG. 5), which are spaced apart to define tortuous passages for flow of coolant fluid, that fluid coolant is thus deflected by the protrusion groups 20, so as to flow turbulently, for maximum heat transfer from the laminations to the protrusions, and thence to the coolant fluid. Note in FIG. 5 that in the axial direction indicated by arrow 22, the groups 20 of protrusions are staggered, as are the coolant flow passages 23 formed between the groups 20. Coolant fluid then flows tortuously, and turbulently, as indicated by arrows 80, for efficient heat removal from the groups 20.

Figure 3:
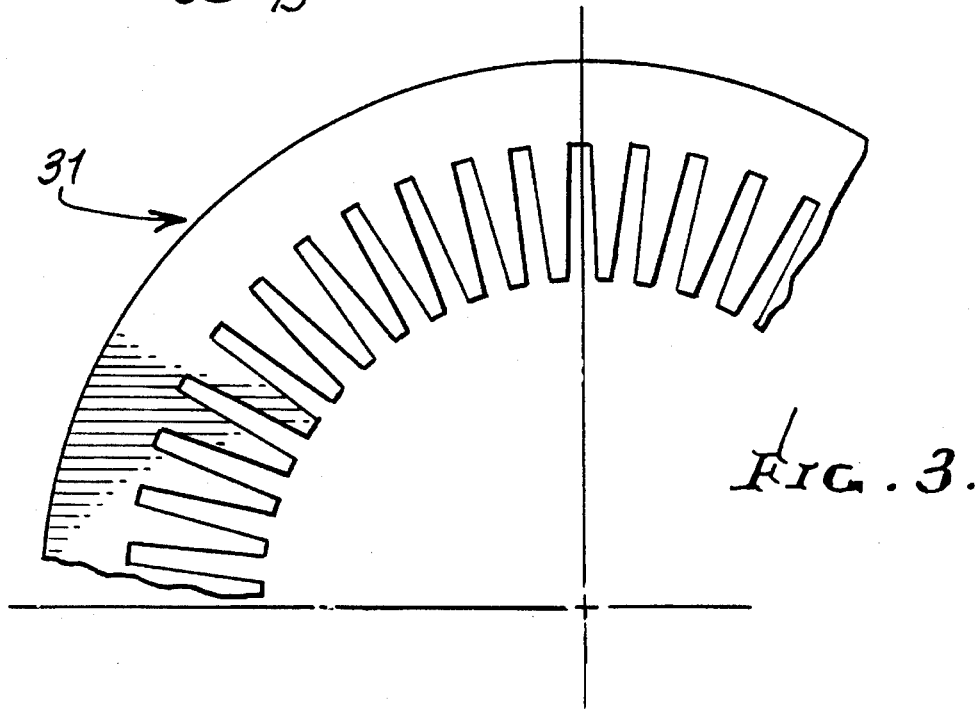
FIG. 3 is an elevation showing a portion of a lamination without protrusions, to be used in a lamination assembly.

Note that the protrusions in each group are in registration, in an axial direction, and project radially relative to axis 13 of the stack. The groups of protrusions are circularly spaced in multiple rows, the rows axially spaced apart; also, the groups of protrusions in a row "n" (axially) are offset about the axis from the groups of protrusions in row (n+1) and in a row (n−1), whereby serpentine fluid flow passages are defined by spaces between the groups of protrusions. The relative positions of the laminations about axis 13 are such that the slots in successive laminations that define the protrusion groups are in axial alignment. Note that sub-stacks 30 of laminations, as seen at 31 in FIG. 3, and which have no protrusions but are otherwise like the laminations 10, are positioned between the sub-stacks 32 of lamination 10 that define the groups 20 of protrusions, whereby circularly open annular passages 33 are formed adjacent the rows n−1, n, n+1, etc., of protrusion groups 20. This enhances coolant flow while accommodating maintenance of turbulent flow, axially, as referred to. In one example, 10 laminations 10 define each sub-stack 32 (defined by the protrusion groups 20) and 5 laminations 31 (free of protrusions) define each sub-stack 30. All such laminations have the same thickness, although thicknesses may vary.

FIG. 6 also shows flow of coolant in an axial direction, indicated by arrows 40 inwardly of a jacket 50 closely surrounding the stator protrusions. Fasteners 50a attach the jacket to the laminations. See FIG. 4a.

Figure 7:
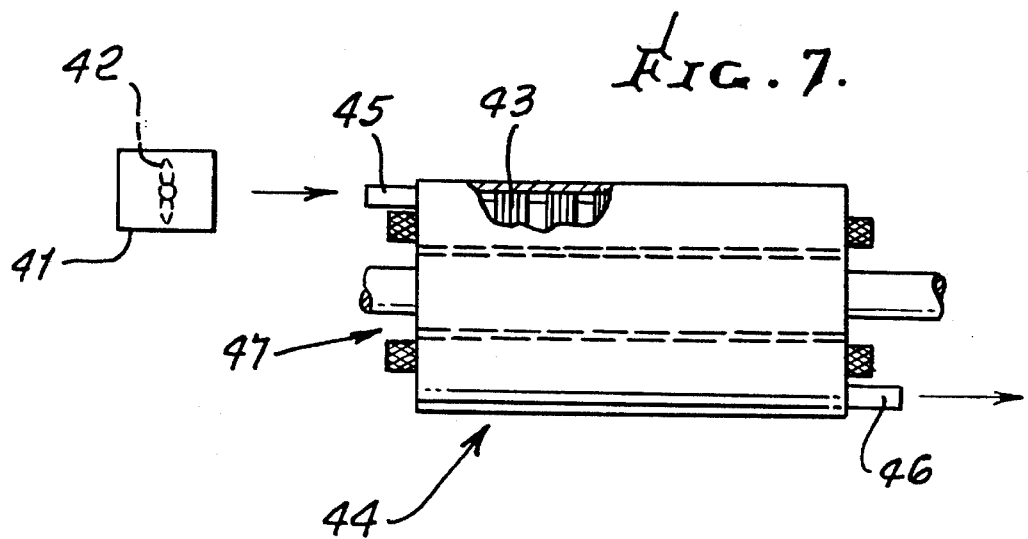
FIGS. 7 and 8 are elevations showing cooling fluid sources and ducting.

In FIG. 7, coolant (liquid and gas) is displaced by a means 41 having an impeller 42, to flow through stator 43 of an electrical machine 44 (such as a motor) incorporating the invention. Entrance and exit ducts appear at 45 and 46. The machine rotor is shown at 47. It may comprise a motor, or generator, etc.

Figure 8:
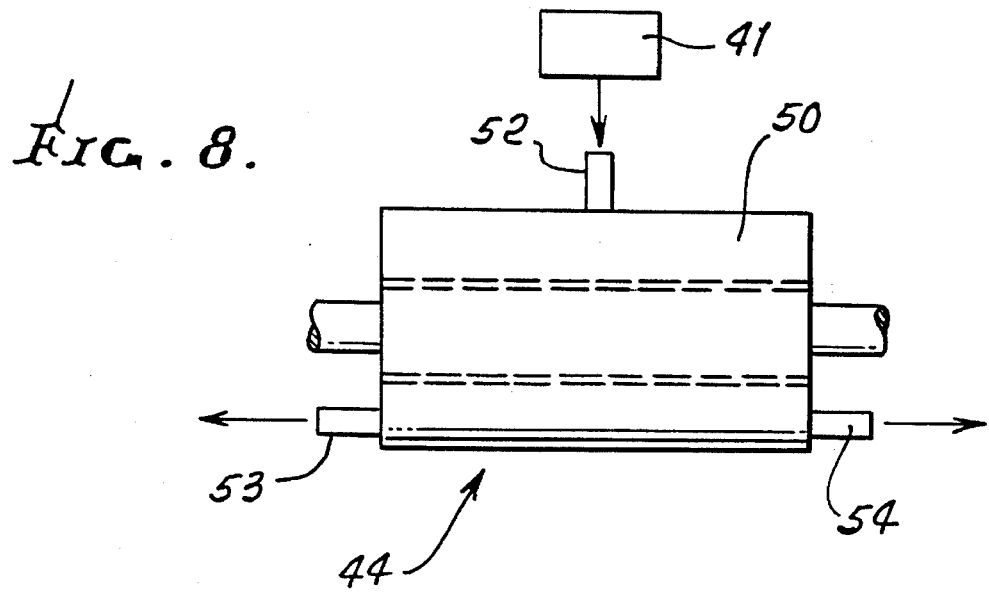

In FIG. 8, coolant enters via duct 52 at a mid-point along the length of jacket 50; the coolant thus flowing over and between the groups of protrusions, as described, to exit in opposite directions, as via ducts 53 and 54.

Figure 9:
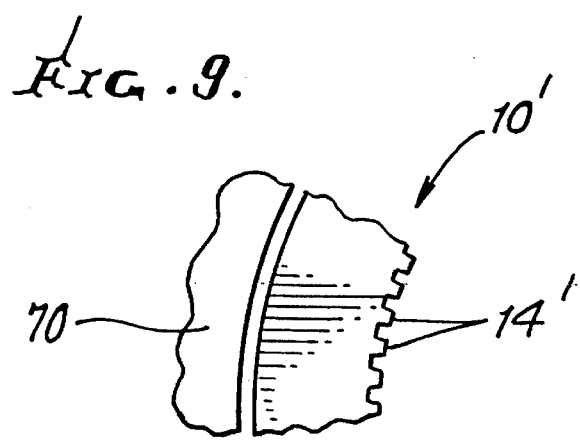
FIG. 9 is a fragmentary view like FIG. 1 showing cooling protrusions on a rotor.

Protrusions 14' are shown at the inner periphery of a lamination 10' in FIG. 9, as in the case of a stator inwardly of laminations 70 on an outer rotor.

The protrusions and groups thereof, as referred to, are also usable on rotor laminations.

The structure, particularly as shown in FIG. 5, is characterized by:

the groups of stacked protrusions in each first group of first laminations being staggered about said axis relative to the group of stacked protrusions in the next in axial sequence first group of first laminations, there being annular gaps between said protrusion first groups, which are substantially less than twice the annular dimensions of said protrusion first groups.

I claim:

1. In a coaxial stack of laminations for the stator or rotor of an electrical machine, the improvement combination comprising:

a) first groups of first laminations each first lamination having a first periphery extending about a central axis defined by the lamination, b) each first lamination also having a series of circularly spaced peripheral protrusions projecting away from said periphery and from the main extent of the lamination, c) there being spaced groups of said protrusions in said stack and wherein the protrusions of each group extend in side-by-side stacked relation, d) there being second groups of second laminations in said stack and located between laminations in said first groups of first laminations, said second laminations being free of peripheral protrusions, whereby circularly open annular passages are formed outwardly of said second groups of second laminations and between said spaced groups of protrusions, e) the groups of stacked protrusions in each first group of first laminations being staggered about said axis relative to the groups of stacked protrusions in the next in axial sequence first group of first laminations, f) there being annular gaps between said protrusion first groups, which are substantially less than twice the annular dimensions of said protrusion first groups.

2. The combination of claim 1 wherein said protrusions project generally radially relative to said axis.

3. The combination of claim 2 wherein said protrusions on each first lamination are equally spaced about said axis.

4. The combination of claim 3 wherein said protrusions on each first lamination have like shape.

5. The combination of claim 1 wherein each said first lamination has a second periphery extending about said axis, the first lamination having slots intersecting said second periphery and extending into the lamination from said second periphery, said slots spaced about said axis.

6. The combination of claim 5 wherein the slots extend toward said protrusions but are everywhere spaced therefrom.

7. The combination of claim 6 wherein said first and second peripheries are circular and concentric, about said axis.

8. The combination of claim 7 wherein the spacing between successive of said protrusions, about said axis, is substantially less than the spacing of successive of said slots, about said axis.

9. The combination of claim 1 wherein said protrusions are alike and have generally rectangular shape in a plane defined by the lamination.

10. The combination of claim 1 wherein the groups of protrusions are circularly spaced in multiple rows, the rows axially spaced apart.

11. The combination of claim 10 wherein the groups of protrusions in a row "n" are angularly offset about said axis from the groups of protrusions in row (n+1) and in a row (n−1), whereby serpentine fluid flow passages are defined by spaces between the groups of protrusions.

12. The combination of claim 11 including impeller means located to displace cooling fluid through said fluid flow passages to contact said groups of protrusions for cooling same.

13. The combination of claim 12 including jacket means extending over said protrusions to shroud said passages and groups of protrusions.

14. The combination of claim 1 wherein each lamination has an inner periphery extending about said axis, each lamination having slots intersecting said second periphery and extending into the lamination from said inner periphery, the slots in successive laminations being in axial alignment.

15. The combination of claim 14 wherein the slots extend toward said protrusions but are everywhere spaced therefrom.

16. The combination of claim 14 including electrical wiring extending through said slots in said laminations, in spaced relation to said protrusions.

\* \* \* \* \*